(12) United States Patent
Berger et al.

(10) Patent No.: US 8,645,870 B2
(45) Date of Patent: Feb. 4, 2014

(54) PREVIEW CURSOR FOR IMAGE EDITING

(75) Inventors: Ralf Berger, Acton, MA (US); Steve M. Troppoli, Carlisle, MA (US)

(73) Assignee: Adobe Systems Incorporated, San Jose, CA (US)

( * ) Notice: Subject to any disclaimer, the term of this patent is extended or adjusted under 35 U.S.C. 154(b) by 1018 days.

(21) Appl. No.: 11/096,805

(22) Filed: Mar. 31, 2005

(65) Prior Publication Data

US 2013/0207997 A1 Aug. 15, 2013

(51) Int. Cl.
*G06F 3/048* (2013.01)

(52) U.S. Cl.
USPC ............ 715/856; 715/711; 715/857; 715/858

(58) Field of Classification Search
USPC ........................... 715/711, 856–858; 345/619
See application file for complete search history.

(56) References Cited

U.S. PATENT DOCUMENTS

| | | | |
|---|---|---|---|
| 5,185,808 A | 2/1993 | Cok | |
| 5,249,263 A * | 9/1993 | Yanker | 345/594 |
| 5,467,441 A * | 11/1995 | Stone et al. | 345/619 |
| 5,528,290 A | 6/1996 | Saund | |
| 5,649,032 A | 7/1997 | Burt et al. | |
| 5,920,657 A | 7/1999 | Bender et al. | |
| 5,963,664 A | 10/1999 | Kumar et al. | |
| 5,986,668 A | 11/1999 | Szeliski et al. | |
| 6,078,701 A | 6/2000 | Hsu et al. | |
| 6,128,108 A | 10/2000 | Teo | |
| 6,249,616 B1 | 6/2001 | Hashimoto | |
| 6,407,747 B1 | 6/2002 | Chui et al. | |
| 6,532,036 B1 | 3/2003 | Peleg et al. | |
| 6,535,650 B1 | 3/2003 | Poulo et al. | |
| 6,618,511 B1 | 9/2003 | Mancuso et al. | |
| 6,704,041 B2 | 3/2004 | Katayama et al. | |
| 6,714,689 B1 | 3/2004 | Yano et al. | |
| 6,731,285 B2 | 5/2004 | Matchen | |
| 6,778,207 B1 | 8/2004 | Lee et al. | |
| 6,788,802 B2 | 9/2004 | Chiba et al. | |
| 7,256,911 B2 * | 8/2007 | Takabayashi et al. | 358/1.9 |
| 7,327,374 B2 | 2/2008 | Oh et al. | |
| 7,593,022 B2 | 9/2009 | Oh et al. | |
| 2002/0118221 A1 * | 8/2002 | Hudson et al. | 345/711 |
| 2002/0140740 A1 * | 10/2002 | Chen | 345/810 |
| 2002/0149612 A1 * | 10/2002 | Malamud et al. | 345/711 |

(Continued)

FOREIGN PATENT DOCUMENTS

| | | |
|---|---|---|
| EP | 0403125 | 12/1990 |
| JP | 10312187 | 11/1998 |
| WO | WO98/02844 | 1/1998 |

OTHER PUBLICATIONS

Adobe Systems Inc., Adobe Photoshop 7.0 Classroom in a Book, Adobe Press, pp. 223-224, 376, 378-379.*

(Continued)

*Primary Examiner* — Tuyetlien Tran
(74) *Attorney, Agent, or Firm* — Finch & Maloney PLLC

(57) ABSTRACT

Methods and systems, including computer program products, implementing a preview cursor for image editing. One method includes displaying an image, receiving user input moving a cursor representing an editing tool to a position on the image, and in response, displaying a cursor icon representing the cursor at the position. The editing tool is operable to have an effect when applied. The cursor icon shows the effect of applying the editing tool at the position while and only while the cursor is at the position.

17 Claims, 4 Drawing Sheets

(56) References Cited

U.S. PATENT DOCUMENTS

| | | | |
|---|---|---|---|
| 2003/0103234 A1* | 6/2003 | Takabayashi et al. | 358/1.15 |
| 2003/0103670 A1* | 6/2003 | Schoelkopf et al. | 382/162 |
| 2003/0146915 A1* | 8/2003 | Brook et al. | 345/473 |
| 2003/0231240 A1* | 12/2003 | Wilkins et al. | 348/207.99 |
| 2004/0205633 A1* | 10/2004 | Martinez et al. | 715/526 |
| 2007/0198942 A1 | 8/2007 | Morris | |

OTHER PUBLICATIONS

Sandee Cohen, Macromedia Freehand 10 for Windows and Macintosh: Visual QuickStart Guide, published Jul. 1, 2001 by PeachPit Press, Chapter 11.*

Microsoft Corporation, Microsoft Windows XP Screen Captures, released Oct. 25, 2001.*

The GIMP Developer Discussion Mailing List Feature Requests for Version 1.3.*

Burt, et al., "A Multresolution Spline With Application to Image Mosaics," ACM Transactions on Graphics, vol. 2, No. 4, Oct. 1983, pp. 217-236.

Chiba, et al., "Feature-Based Image Mosaicing," IAPR Workshop on Machine Vision Applications, Nov. 17-19, 1998, pp. 5-10.

Davis, "Mosaics of Scenes with Moving Objects," Proceedings of CVPR '98, Jun. 1998, 7 pages.

Girod, Bernd et al., "Direct Estimation of Displacement Histograms," OSA Meeting on Image Understanding and Machine Vision, Cape Cod, MA, Jun. 1989, pp. 73-76.

Gumustekin, "An Introduction to Image Mosaicing," Jul. 1999, 13 pgs.

Peleg, "Elimination of Seams from Photomosaics," Computer Graphics and Image Processing, 16, Jun. 5, 1980, pp. 91-94.

Szeliski, et al., "Creating Full View Panoramic Image Mosaics and Environment Maps," Proceedings of the 24th annual conference on Computer graphics and interactive techniques, 1997, 8 pages.

Xiong, et al., "Registration, Calibration and Blending in Creating High Quality Panoramas," Applications of Computer Vision, Proceedings of the Fourth IEEE Workshop, Los Alamitor, CA Oct. 19-21, 1998, pp. 69-74.

* cited by examiner

PREVIEW CURSOR FOR IMAGE EDITING

BACKGROUND

The present invention relates to user interfaces for image editing. In conventional image editing systems, a user can edit an image by moving a cursor to a location in the image and then applying the edit at the location pointed to by the cursor. Typically, the effect of the edit cannot be seen until after the edit has been applied. Often, the edit must be undone and then reapplied until the desired result is achieved.

SUMMARY

The invention provides methods and systems, including computer program products, implementing a preview cursor for image editing.

In one aspect, the invention provides a method that includes displaying an image, receiving user input moving a cursor representing an editing tool to a position on the image, and in response, displaying a cursor icon representing the cursor at the position. The editing tool is operable to have an effect when applied. The cursor icon shows the effect of applying the editing tool at the corresponding position while and only while the cursor is at the position.

Implementations can include one or more of the following features.

The method further includes establishing for cursor display an alternative of a preview mode or a normal mode. The cursor icon displayed in the preview mode shows the effect of applying the editing tool at the position while and only while the cursor is at the position. The cursor icon displayed while in normal mode shows a normal cursor display. The normal cursor display is a cross-hair, an arrow, a brush, a circle, or an ellipse.

The editing tool is one of a paint brush, a clone brush, a perspective brush, an erasure brush, a stamp brush, a blur brush, a sharpen brush, a smudge brush, or a liquify warp brush.

Displaying an image includes displaying a copy of the image, the copy being in a lower resolution than the image. The cursor icon shows the effect of applying the editing tool to the displayed copy, not to the image.

Applying the editing tool includes applying a simplified version of the editing tool, the simplified version being a less computationally intensive version of the editing tool.

The image is a composited rendering of a document having two or more layers. Applying the editing tool includes applying the editing tool into a new layer.

The image contains an element that has perspective. The perspective is preserved when the edit is applied to the element. The cursor displayed in preview mode shows the effect of applying the edit with the perspective preserved.

The element is a two-dimensional (2-D) representation of a three-dimensional (3-D) object.

The cursor icon is displayed only while the cursor is stationary.

In another aspect, the invention provides a system that includes an editing tool for editing an image and a preview cursor representing the editing tool. The preview cursor is operable to show the effect of applying the editing tool at a position in the image while and only while the preview cursor is at the position.

Implementations can include one or more of the following features.

The editing tool is one of a paint brush, a clone brush, a perspective brush, an erasure brush, a stamp brush, a blur brush, a sharpen brush, a smudge brush, or a liquify warp brush.

The preview cursor shows the effect of applying the editing tool to a displayed copy of the image, the displayed copy being in a lower resolution than the image.

Applying the editing tool includes applying a simplified version of the editing tool, the simplified version being a less computationally intensive version of the editing tool.

The image is a composited rendering of a document having two or more layers. Applying the editing tool includes applying the editing tool into a new layer.

The invention can be implemented to realize one or more of the following advantages.

The preview cursor allows a user to see how an edit will look before the user applies the editing tool to the image. This is particularly helpful when applying an editing tool whose effect varies depending on location. Blending, cloning, and perspective editing are examples of such an edit.

This is also particularly helpful when applying an edit that must be positioned very precisely. Cloning and erasing are examples of such an edit. The preview cursor reduces the amount of guesswork that is involved in positioning the cursor.

The preview cursor can show aspects of the editing tool that cannot be shown by conventional cursors. For example, the preview cursor can show the edge softness and opacity value of the brush.

The preview cursor can be used with a variety of different editing tools including, but not limited to, paint brushes, perspective brushes, erasure brushes, clone brushes, stamp brushes, blur brushes, sharpen brushes, smudge brushes, and liquify warp brushes.

The details of one or more implementations of the invention are set forth in the accompanying drawings and the description below. Other features, aspects, and advantages of the invention will become apparent from the description, the drawings, and the claims.

DESCRIPTION OF DRAWINGS

Like reference symbols in the various drawings indicate like elements.

DETAILED DESCRIPTION

Figure 1:
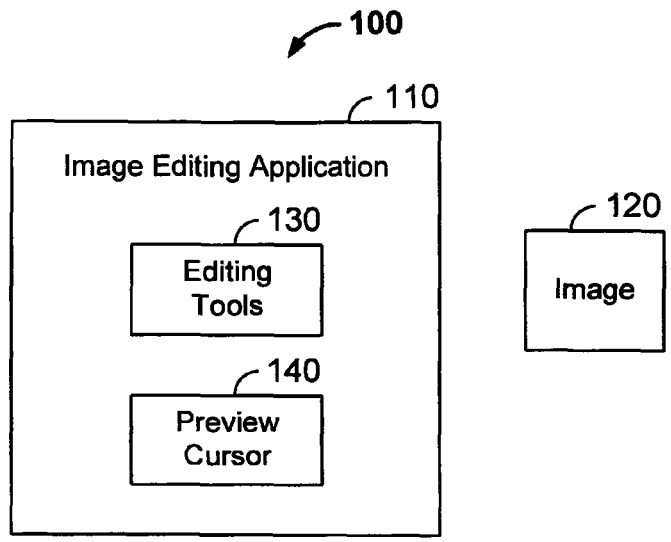
FIG. 1 illustrates a system in accordance with one implementation of the invention.

As illustrated in FIG. 1, a system in accordance with one implementation of the invention includes a computer program that is an image editing application 110. Adobe Photoshop® available from Adobe Systems Incorporated of San Jose, Calif. is an example of an image editing application.

The image editing application 110 is operable to display an image 120 for viewing and editing by a user of the application. The image 120 can be any digital image, for example, a photograph, a frame of a video or an animation, or a web page.

The image editing application 110 provides to the user one or more editing tools 130 for editing the image. Examples of editing tools are paint brushes, perspective brushes, erasure brushes, clone brushes, stamp brushes, blur brushes, sharpen brushes, smudge brushes, and liquify warp brushes.

To edit the image 120, a user selects an editing tool and then selects a position in the image where the tool is to be applied. The user selects the position by moving a cursor representing the editing tool to a position over the image. The cursor is an icon that floats above the image. The movement of the cursor can be controlled using an input device, for example, a mouse or a keyboard.

Whenever the cursor is positioned over the image, the cursor icon shows the effect of applying the selected editing tool at the current position. For example, if the tool is a paint brush, the pixels that form the cursor icon are changed to show the effect of applying the paint brush at the current position. Such a cursor will be referred to as a preview cursor 140.

The preview cursor 140 allows the user to see how the edit will look before the editing tool is actually applied to the image 120. Once the user is satisfied with the preview, the user can then instruct the image editing application 110 to apply the editing tool to the image 120. The instruction can be made by pressing down on a mouse button or entering a particular keystroke on a keyboard, for example. In response to the instruction, the image editing application 110 applies the editing tool at the current position. Optionally, the cursor icon that represents the preview cursor can have a mark (e.g., a cross or a dot) at the center to show the user where cursor is currently positioned.

In one implementation, the image editing application 110 displays a copy of the image 120. In such an implementation, the preview cursor 140 shows the effect of applying the editing tool to the displayed copy. In other words, the pixels that are displayed are changed, but the pixels of the image 120 are not changed. The copy can be in a lower resolution than the original, and therefore, changing the copy can be computationally less intensive than changing the original.

Additionally, the effect that is shown by the preview cursor 140 can be the effect of applying a simplified version of the editing tool. For example, where the editing tool is implemented as a filter, the preview cursor 140 can show the effect of applying a less computationally intensive version of the filter. The application of the full, more computationally intensive version of the filter can be delayed until the image is being edited.

In one implementation, the image 120 is a composited rendering of a document having two or more layers. Such an image is described in U.S. patent application Ser. No. 09/470, 260, entitled "Hierarchical 2-D Color Compositing with Blending Mode and Opacity Controls at All Levels", the contents of which are incorporated here by reference. In such an implementation, the preview cursor 140 can show the effect of applying the editing tool in a new layer of the image. When the cursor position changes, this new layer can be discarded or cleared.

In some cases, the image 120 contains elements that are two-dimensional (2-D) representations of three-dimensional (3-D) objects. These elements can have a perspective that is based on their distance from the camera. When an edit is applied to such an image, the edit accounts for and preserves the perspective. Perspective editing tools are described, for example, in U.S. patent application Ser. No. 10,/974, 547, entitled "Perspective Editing Tools for 2-D Images", the contents of which are incorporated here by reference.

Where the selected editing tool is a perspective editing tool, the way the preview cursor is displayed accounts for the perspective. For example, where the edit is a perspective cloning operation, if the current location where the clone will be placed is very close to the vanishing point of the image, then the clone that is applied will not be the same size as the source object, but will instead be reduced in size relative to the source. In this example, the preview cursor for the clone operation will appear in the small size that is appropriate for the position relative to the perspective. This allows the user to see the effect of the perspective on the clone operation before applying the clone operation.

Figure 2:
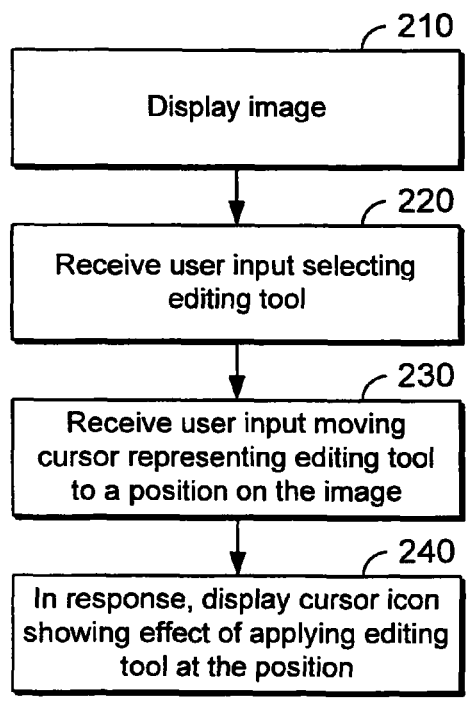
FIGS. 2 and 3 illustrate a method in accordance with one implementation of the invention.

As illustrated in FIG. 2, during system operation, the image editing application displays an image to be edited (step 210).

The user selects an editing tool to be used on the image (step 220). The selection can be performed by user input selecting an editing tool, for example, from a menu or palette of editing tools.

The image editing application receives user input moving a cursor representing the editing tool to a position on the image (step 230) and in response to the received user input, displays a cursor icon representing the cursor at the position (step 240).

Figure 3:
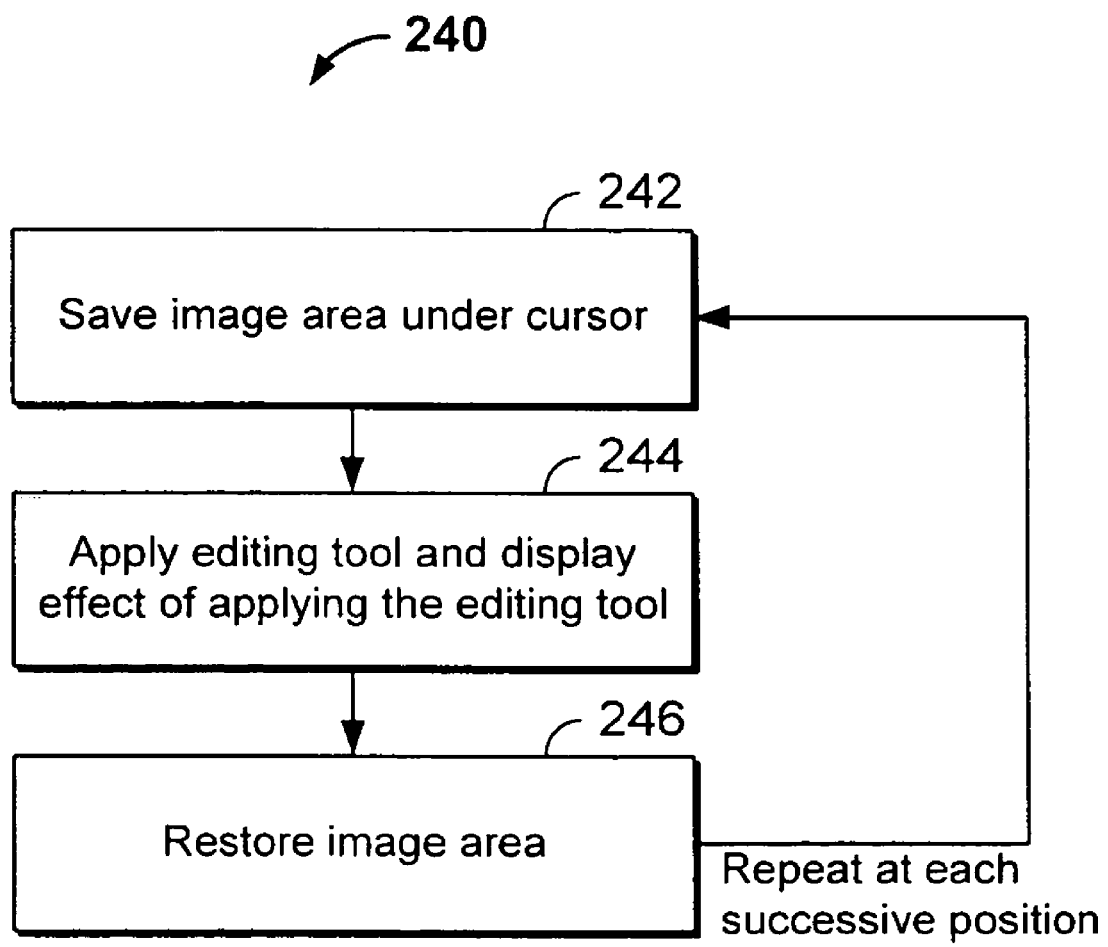

As illustrated in FIG. 3, the action of displaying the cursor icon representing the cursor at the position (step 240) can involve first saving the pixels in the image area under the cursor icon (step 242) and then applying the editing tool and displaying the effect of applying the editing tool (step 244). When the cursor is moved to a new position, the image area under the cursor icon is restored with the saved pixels (step 246), the previous actions (steps 242, 244) are repeated at the new position.

Figure 4:
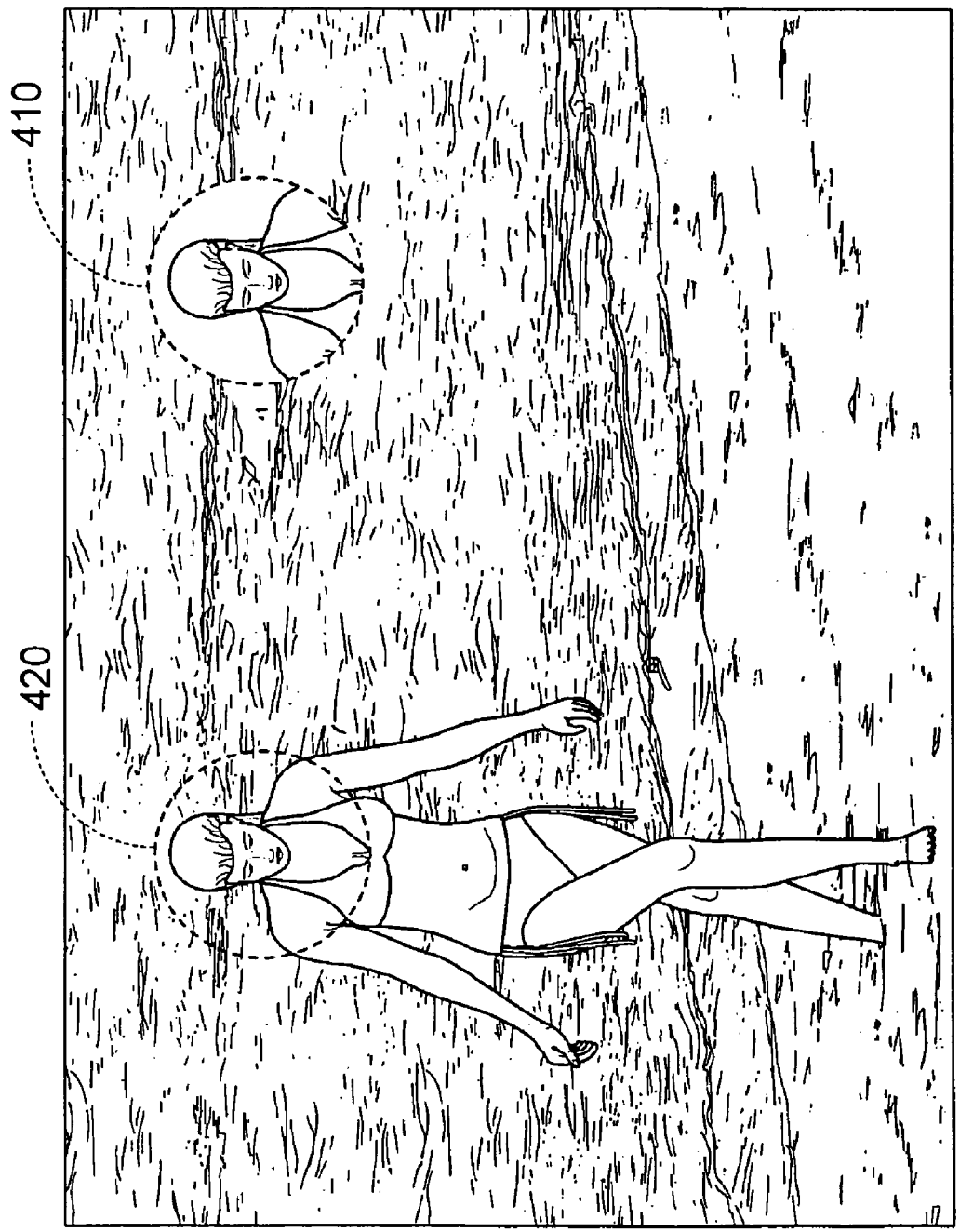
FIGS. 4 and 5 illustrate a preview cursor for a clone brush.
Figure 5:
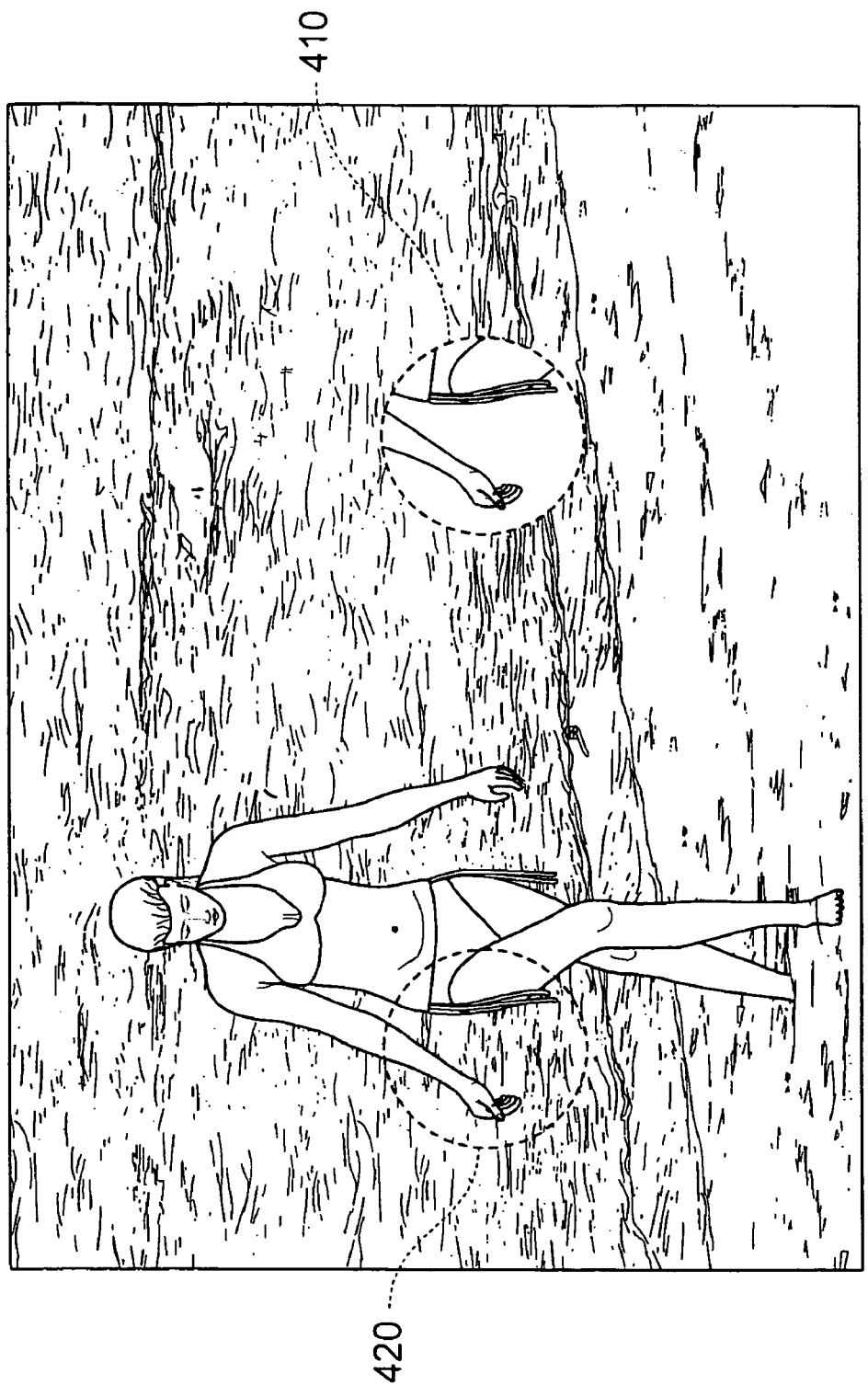

As illustrated in FIG. 4, a preview cursor 410 for a clone brush shows the effect of applying the clone brush at first position to clone a source position 420. As illustrated in FIG. 5, when the preview cursor 410 for the clone brush is moved to a new position, the appearance of the preview cursor 410 changes accordingly.

Optionally, the image editing application can operate in two modes as to editing tool cursors, a normal mode and a preview mode. When in normal mode, the cursor icon displayed shows a normal cursor display, which can be a crosshair, an arrow, a brush, a circle, an ellipse or some other appearance. The appearance of the normal cursor display can be selectable by a user. When in preview mode, the cursor icon shows the effect of applying the editing tool at the current position. In other words, the cursor functions as a preview cursor only when the preview mode is activated. The image editing application can activate the preview mode in response to user input activating the preview mode. In one implementation, the cursor icon is displayed only while the cursor is stationary, or moving at a speed slower than a threshold value.

Implementations of the invention and all of the functional operations described in this specification can be implemented in digital electronic circuitry, or in computer software, firmware, or hardware, including the structural means disclosed in this specification and structural equivalents thereof, or in combinations of them. Implementations of the invention can be implemented as one or more computer program products, i.e., one or more computer programs tangibly embodied in an information carrier, e.g., in a machine-readable storage device or in a propagated signal, for execution by, or to control the operation of, data processing apparatus, e.g., a programmable processor, a computer, or multiple processors or computers. A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub-programs, or portions of code). A computer program can be deployed to be executed on one computer or on multiple computers at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Particular implementations of the invention have been described. Other implementations are within the scope of the following claims. For example, the actions recited in the claims can be performed in a different order and still achieve desirable results.

What is claimed is:

1. A computer program product, stored on a computer-readable storage device medium, operable to cause a data processing apparatus to perform operations comprising:
    displaying an image that includes an element forming part of a two-dimensional representation of a three-dimensional object, wherein the element has perspective based on a perceived distance within the image;
    receiving user input moving a cursor representing an editing tool to a position on the image, the editing tool being operable to make an alteration, when applied, in a local area of the image that includes the position, and in response to the received user input and absent additional user input, displaying a cursor icon representing the cursor at the position, wherein the cursor icon shows a preview of the alteration at the local area while and only while the cursor is at the position, wherein the preview of the alteration corresponds to applying a simplified version of the editing tool in the local area, the simplified version being a less computationally intensive version of the editing tool and editing operations of the simplified version of the editing tool are different from editing operations of the editing tool;
    receiving user input, after displaying the cursor icon showing the preview of the alteration, to apply the alteration in the local area; and
    applying the alteration in the local area of the image,
    wherein the editing tool is a perspective editing tool and the alteration is a perspective cloning operation, and
    wherein the cursor icon has a size that varies based on the position on the image to which the cursor is moved.

2. The product of claim 1, further comprising:
    establishing for cursor display an alternative of a preview mode or a normal mode, and wherein the cursor icon displayed in the preview mode shows the alteration in the local area while and only while the cursor is at the position and wherein the cursor icon displayed while in the normal mode shows a normal cursor display.

3. The product of claim 2, wherein the normal cursor display is a cross-hair, an arrow, a brush, a circle, or an ellipse.

4. The product of claim 1, wherein:
    the image is a copy of another image, the copy being in a lower resolution than the other image; and
    the cursor icon shows the alteration applied to the copy, not to the other image.

5. The product of claim 1, wherein:
    the image is a composited rendering of a document having two or more layers; and
    applying the editing tool includes applying the editing tool into a new layer.

6. The product of claim 1, wherein:
    the perspective of the element is preserved when the editing tool is applied to the element; and
    the preview shows the alteration applied with the perspective preserved.

7. The product of claim 1, wherein the cursor icon is displayed only while the cursor is stationary.

8. A method comprising:
    displaying an image that includes an element forming part of a two-dimensional representation of a three-dimensional object, wherein the element has perspective based on a perceived distance within the image;
    receiving user input moving a cursor representing an editing tool to a position on the image, the editing tool being operable to make an alteration, when applied, in a local area of the image that includes the position, and in response to the received user input and absent additional user input, displaying a cursor icon representing the cursor at the position, wherein the cursor icon shows a preview of the alteration at the local area while and only while the cursor is at the position, wherein the preview of the alteration corresponds to applying a simplified version of the editing tool in the local area, the simplified version being a less computationally intensive version of the editing tool and editing operations of the simplified version of the editing tool are different from editing operations of the editing tool;

receiving user input, after displaying the cursor icon showing the preview of the alteration, to apply the alteration in the local area; and applying the alteration in the local area of the image, wherein the editing tool is a perspective editing tool and the alteration is a perspective cloning operation, and wherein the cursor icon has a size that varies based on the position on the image to which the cursor is moved.

9. The method of claim 8, further comprising:

establishing for cursor display an alternative of a preview mode or a normal mode, and wherein the cursor icon displayed in the preview mode shows the alteration in the local area while and only while the cursor is at the position and wherein the cursor icon displayed while in the normal mode shows a normal cursor display.

10. The method of claim 9, wherein the normal cursor display is a cross-hair, an arrow, a brush, a circle, or an ellipse.

11. The method of claim 8, wherein:

the image is a copy of another image, the copy being in a lower resolution than the other image; and the cursor icon shows the alteration applied to the copy, not to the other image.

12. The method of claim 8, wherein:

the image is a composited rendering of a document having two or more layers; and applying the editing tool includes applying the editing tool into a new layer.

13. The method of claim 8, wherein:

the perspective of the element is preserved when the editing tool is applied to the element; and the preview shows the alteration applied with the perspective preserved.

14. The method of claim 8, wherein the cursor icon is displayed only while the cursor is stationary.

15. A system comprising:

a processor; and memory storing instructions, which when executed by the processor, result in:

an editing tool for making an alteration in an image, wherein the image includes an element forming part of a two-dimensional representation of a three-dimensional object, wherein the element has perspective based on a perceived distance within the image;

a preview cursor representing the editing tool, the preview cursor being operable to show a preview of the alteration in a local area of the image while and only while the preview cursor is at a position included in the local area, wherein the preview of the alteration corresponds to applying a simplified version of the editing tool in the local area, the simplified version being a less computationally intensive version of the editing tool and editing operations of the simplified version of the editing tool are different from editing operations of the editing tool; and an input component to receive user input, after displaying the preview cursor showing the preview, to apply the alteration in the local area, wherein upon the input component receiving the user input and absent additional user input, the editing tool applies the effect to a region defined by the preview cursor, wherein the editing tool is a perspective editing tool and the alteration is a perspective cloning operation, and wherein the preview cursor has a size that varies based on the position in the local area at which the preview cursor is located.

16. The system of claim 15, wherein the image is a copy of another image and the preview cursor shows the alteration applied to the copy of the other image, the copy being in a lower resolution than the other image.

17. The system of claim 15, wherein:

the image is a composited rendering of a document having two or more layers; and applying the editing tool includes applying the editing tool into a new layer.

\* \* \* \* \*